United States Patent
Imai et al.

(10) Patent No.: US 10,547,652 B2
(45) Date of Patent: Jan. 28, 2020

(54) COMMUNICATION CONTROL DEVICE, COMMUNICATION SYSTEM, AND COMMUNICATION CONTROL METHOD

(71) Applicant: RICOH COMPANY, LTD., Tokyo (JP)

(72) Inventors: Takuya Imai, Tokyo (JP); Kenichiro Morita, Tokyo (JP); Shoh Nagamine, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 195 days.

(21) Appl. No.: 15/705,680

(22) Filed: Sep. 15, 2017

(65) Prior Publication Data
US 2018/0007095 A1 Jan. 4, 2018

Related U.S. Application Data

(63) Continuation of application No. PCT/JP2016/001525, filed on Mar. 16, 2016.

(30) Foreign Application Priority Data

Mar. 19, 2015 (JP) ................................. 2015-056129

(51) Int. Cl.
G06F 15/173 (2006.01)
H04L 29/06 (2006.01)

(52) U.S. Cl.
CPC ........ *H04L 65/1086* (2013.01); *H04L 65/403* (2013.01); *H04L 65/80* (2013.01)

(58) Field of Classification Search
USPC .......................................................... 709/223
See application file for complete search history.

(56) References Cited

U.S. PATENT DOCUMENTS

| 7,062,548 B1* | 6/2006 | Peres | H04Q 3/0066 |
| | | | 709/223 |
| 8,503,437 B2* | 8/2013 | Krause | H04L 12/66 |
| | | | 370/352 |

(Continued)

FOREIGN PATENT DOCUMENTS

| JP | 2006-295587 | 10/2006 |
| JP | 4905929 | 1/2012 |

(Continued)

OTHER PUBLICATIONS

International Search Report dated Jun. 14, 2016 in PCT/JP2016/001525 filed Mar. 16, 2016.

(Continued)

*Primary Examiner* — Anthony Mejia
(74) *Attorney, Agent, or Firm* — Xsensus LLP

(57) ABSTRACT

A communication control device is configured to control data communication between terminals using a communication network. The communication control device include: a status-information acquiring unit configured to acquire respective pieces of status information which represent operating states of the terminals; a reception-information acquiring unit configured to acquire respective pieces of reception information which represent states of the communication network when the terminals have received data; a communication determining unit configured to determine a type of communication on the basis of a combination of pieces of status information of multiple terminals that participate in the same communication; and a quality control unit configured to control quality of data that each terminal transmits or receives on the basis of the determined type of communication and the acquired reception information.

20 Claims, 17 Drawing Sheets

(56) References Cited

U.S. PATENT DOCUMENTS

| | | | |
|---|---|---|---|
| 9,083,770 B1* | 7/2015 | Drose | G06Q 20/14 |
| 2005/0071182 A1* | 3/2005 | Aikens | G06Q 10/00 |
| | | | 705/500 |
| 2007/0112939 A1* | 5/2007 | Wilson | H04L 12/2807 |
| | | | 709/219 |
| 2008/0002676 A1* | 1/2008 | Wiley | H04L 29/06027 |
| | | | 370/356 |
| 2008/0301230 A1* | 12/2008 | Li | H04L 51/04 |
| | | | 709/204 |
| 2011/0221607 A1* | 9/2011 | Ramanathan | H04L 12/6418 |
| | | | 340/686.6 |
| 2012/0026279 A1 | 2/2012 | Kato | |
| 2014/0267565 A1 | 9/2014 | Nakafuji et al. | |
| 2016/0094594 A1 | 3/2016 | Imai et al. | |
| 2016/0191664 A1* | 6/2016 | Balakrishnan | H04L 67/306 |
| | | | 709/203 |

FOREIGN PATENT DOCUMENTS

| | | |
|---|---|---|
| JP | 5402389 | 11/2013 |
| JP | 2016-072970 | 5/2016 |

OTHER PUBLICATIONS

Written Opinion dated Jun. 14, 2016 in PCT/JP2016/001525 filed Mar. 16, 2016.
Extended European Search Report dated Dec. 15, 2017 in European Patent Application No. 16764498.8, 10 pages.

* cited by examiner

```
<status>
    <id>192.168.0.xy</id>
    <microphone>off</microphone>
    <camera>off</camera>
    <share>notusing</share>
    <layout>
        <type>single</type>
        <source>192.168.0.xx</source>
    </layout>
</status>
```

| COMMUNICATION TYPE | ROLE | PACKET LOSS RATE | VIDEO | | VOICE |
| --- | --- | --- | --- | --- | --- |
| | | | RESOLUTION | FRAME RATE | BIT RATE |
| ONE-WAY COMMUNICATION | LEAD-ING | 0 TO 1% | 1920 × 1080 | 30 | 256kbps |
| | | 1 TO 5% | 1280 × 720 | 30 | 256kbps |
| | | 5% TO | 720 × 480 | 30 | 128kbps |
| | SUBORDINATE | 0 TO 1% | 720 × 480 | 15 | 256kbps |
| | | 1 TO 5% | 320 × 240 | 15 | 256kbps |
| | | 5% TO | 320 × 240 | 10 | 128kbps |
| TWO-WAY COMMUNICATION | LEAD-ING | 0 TO 1% | 1280 × 720 | 10 | 256kbps |
| | | 1 TO 5% | 720 × 480 | 10 | 256kbps |
| | | 5% TO | 320 × 240 | 10 | 256kbps |

2200
QUALITY MANAGEMENT DB

| MICROPHONE STATUS ||
|---|---|
| PARTICIPATING LOCATION | STATUS |
| 192.168.0.xx | 1 (on) |
| 192.168.0.xy | 0 (off) |
| 192.168.0.yy | 0 (off) |

| CAMERA STATU ||
|---|---|
| PARTICIPATING LOCATION | STATUS |
| 192.168.0.xx | 1 (on) |
| 192.168.0.xy | 0 (off) |
| 192.168.0.yy | 0 (off) |

| SCREEN-SHARING STATUS ||
|---|---|
| PARTICIPATING LOCATION | STATUS |
| 192.168.0.xx | 1 (share) |
| 192.168.0.xy | 0 (not share) |
| 192.168.0.yy | 0 (not share) |

| SCREEN LAYOUT STATUS ||
|---|---|
| PARTICIPATING LOCATION | STATUS |
| 192.168.0.xx | 1 (multiple) |
| 192.168.0.xy | 0 (single) |
| 192.168.0.yy | 0 (single) |

FIG.10A

| DETERMINATION RULE | COMMUNICATION TYPE | LOCATION TAKING INITIATIVE |
|---|---|---|
| THERE IS ONLY ONE LOCATION WHERE MICROPHONE IS ON | ONE-WAY COMMUNICATION | LOCATION WHERE MICROPHONE IS ON |
| CONDITION FOR ONE-WAY COMMUNICATION IS NOT SATISFIED | TWO-WAY COMMUNICATION | ALL LOCATIONS |

FIG.10B

| DETERMINATION RULE | COMMUNICATION TYPE | LOCATION TAKING INITIATIVE |
|---|---|---|
| THERE IS ONLY ONE LOCATION WHERE CAMERA IS ON | ONE-WAY COMMUNICATION | LOCATION WHERE CAMERA IS ON |
| CONDITION FOR ONE-WAY COMMUNICATION IS NOT SATISFIED | TWO-WAY COMMUNICATION | ALL LOCATIONS |

FIG.10C

| DETERMINATION RULE | COMMUNICATION TYPE | LOCATION TAKING INITIATIVE |
|---|---|---|
| SCREEN SHARING | ONE-WAY COMMUNICATION | LOCATION OF SOURCE OF DATA SHARED AMONG SCREENS |
| NO SCREEN SHARING | TWO-WAY COMMUNICATION | ALL LOCATIONS |

FIG.10D

| DETERMINATION RULE | COMMUNICATION TYPE | LOCATION TAKING INITIATIVE |
|---|---|---|
| THERE ARE MULTIPLE LOCATIONS WHERE ONLY VIDEO FROM CERTAIN LOCATION IS DISPLAYED | ONE-WAY COMMUNICATION | CERTAIN LOCATION |
| CONDITION FOR ONE-WAY COMMUNICATION IS NOT SATISFIED | TWO-WAY COMMUNICATION | ALL LOCATIONS |

| DATA ID | REQUESTING LOCATION | RESOLUTION | FRAME RATE |
|---|---|---|---|
| Dv001 | 192.168.0.xy | 1920×1080 | 30 |
| Dv001 | 192.168.0.yy | 1280×720 | 30 |
| Dv002 | 192.168.0.xx | 720×480 | 15 |
| ⋮ | ⋮ | ⋮ | ⋮ |

| TERMINAL NAME | OPERATING STATUS | IP ADDRESS | MICROPHONE STATUS | CAMERA STATUS | ... |
|---|---|---|---|---|---|
| TERMINAL A | ONLINE (DURING COMMUNICATION) | 192.168.0.xx | ON | ON | |
| TERMINAL B | ONLINE (DURING COMMUNICATION) | 192.168.0.xy | OFF | OFF | |
| TERMINAL C | ONLINE (DURING COMMUNICATION) | 192.168.0.yy | OFF | OFF | |
| TERMINAL D | OFFLINE | 192.168.1.xx | OFF | OFF | |
| ... | | | ... | ... | |

TERMINAL MANAGEMENT DB  
6100

COMMUNICATION CONTROL DEVICE, COMMUNICATION SYSTEM, AND COMMUNICATION CONTROL METHOD

CROSS-REFERENCE TO RELATED APPLICATIONS

The present application is a continuation application of International Application No. PCT/JP2016/001525, filed Mar. 16, 2016, which claims priority to Japanese Patent Application No. 2015-056129, filed Mar. 19, 2015. The contents of these applications are incorporated herein by reference in their entirety.

BACKGROUND OF THE INVENTION

1. Field of the Invention

The present invention relates to a communication control device, a communication system, and a communication control method.

2. Description of the Related Art

As one of communication systems that realize communication among users using a communication network such as the Internet, a video conference system has been in widespread use. The video conference system realizes a remote conference among geographically distant locations by causing respective terminals at the locations, each connected to a communication network, to perform data communication among the terminals in such a manner that a video and voice collected by a camera and microphone of a terminal at one location is output from display devices and speakers of terminals at the other locations.

When data communication is performed among terminals by using a communication network, the volume of data that can be transmitted at one time is limited by the bandwidth of the communication network (the network bandwidth). Therefore, when data of a high-quality video and voice or the like is transmitted/received among the terminals, there is a problem that according to the state of the network bandwidth, a delay or packet loss may occur because the data volume is too large. Accordingly, there is also known a video conference system equipped with a function of automatically adjusting the quality of data to be transmitted/received among terminals according to the state of the network bandwidth. Incidentally, the network bandwidth here does not mean the range of frequencies used in communication but means the transmission line capacity (bit rate: bps) of a communication network, i.e., means the data transmission capability (how much volume of data is able to be transmitted per unit time) of a communication network.

When the quality of data is reduced according to the state of the network bandwidth, it is preferable to reduce the quality of unimportant data first, of all data that terminals at all locations participating in communication transmit/receive. Furthermore, when the state of the network bandwidth has been restored and the quality of data is increased, it is preferable to increase the quality of important data first. Here, data to be important in realizing smooth communication differs according to the type of the communication. For example, if the type of the communication is one-way communication, such as a presentation style, a video and voice transmitted from a terminal of a user who is sending information (a terminal taking a leading role in communication) is of high importance.

Accordingly, there is proposed a technology to realize appropriate quality control according to the network bandwidth by determining a compression parameter of data that each terminal transmits on the basis of conference type information indicating the type of a conference (communication) set by a user and reception quality information representing the communication state of a network when a terminal has received data (for example, the packet loss rate) (see Japanese Patent No. 5402389).

However, in the technology described in Japanese Patent No. 5402389, a user has to set the type of remote communication in advance, and, if the type of the communication is changed in the middle of the communication, each time it happens, the user has to reset the type of remote communication; therefore, it has an issue that user operation is cumbersome and puts a burden on the user.

SUMMARY OF THE INVENTION

According to one aspect of the present invention, A communication control device is configured to control data communication between terminals using a communication network. The communication control device include: a status-information acquiring unit configured to acquire respective pieces of status information which represent operating states of the terminals; a reception-information acquiring unit configured to acquire respective pieces of reception information which represent states of the communication network when the terminals have received data; a communication determining unit configured to determine a type of communication on the basis of a combination of pieces of status information of multiple terminals that participate in the same communication; and a quality control unit configured to control quality of data that each terminal transmits or receives on the basis of the determined type of communication and the acquired reception information.

BRIEF DESCRIPTION OF THE DRAWINGS

FIGS. 10A to 10D are diagrams illustrating an example of determination rules when the communication type is determined;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
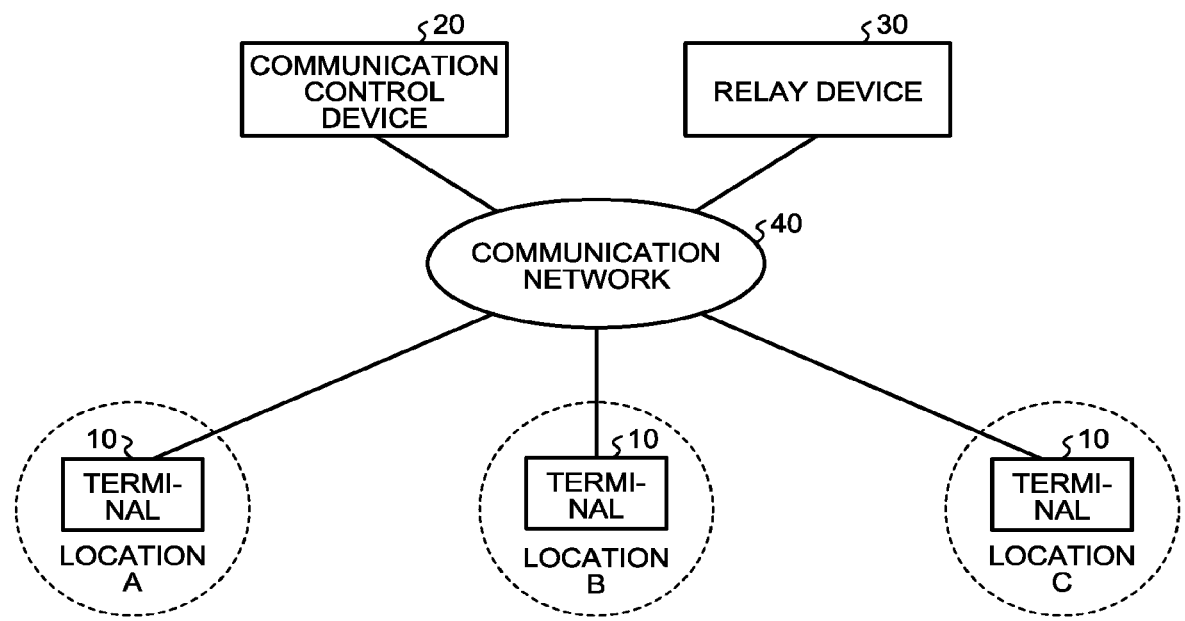
FIG. 1 is a schematic configuration diagram of a video conference system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of a communication control device, communication system, and communication control method according to the present invention are described in detail below with reference to the accompanying drawings. As an example of a communication system to which the present invention is applied, a video conference system enabling a remote conference among geographically distant locations is exemplified below. In this video conference system, video conference terminals (hereinafter, referred to as "terminals") placed at the locations perform communication using a communication network, thereby realizing communication among remote locations. However, a communication system to which the present invention is applicable is not limited to this example. The present invention can be applied widely to various communication systems in which multiple terminals perform data communication using a communication network.

The communication here means the act of sharing information among people (among users who use terminals) through sending and receiving of the information. This communication is categorized broadly into one-way communication and two-way communication; the one-way communication is a form of communication in which roles of the information sending side and the information receiving side are not swapped (i.e., someone continues to send information), and the two-way communication is a form of communication in which roles of the information sending side and the information receiving side are frequently swapped (i.e., a dialogue is established). To cite an example of a conference, a presentation-style conference falls under the category of one-way communication, and a brainstorming-style conference falls under the category of two-way communication. In the following, the one-way communication and the two-way communication shall be treated as the type of communication.

First Embodiment

FIG. 1 is a schematic configuration diagram of a video conference system according to a first embodiment. As illustrated in FIG. 1, the video conference system according to the present embodiment has a configuration in which terminals 10 at different locations that participate in communication using the video conference system, a communication control device 20, and a relay device 30 are connected via a communication network 40. The communication network 40 is constructed of a single or combination of network technologies, such as the Internet and a local area network (LAN). This communication network 40 can include not only wired part but also wireless part where communication is performed using wireless technology, such as Wireless Fidelity (WiFi) and Bluetooth™.

The number of the terminals 10 connected to the communication network 40 corresponds to the number of locations that participate in the communication. In the present embodiment, as an example, assuming it is communication among three locations: Locations A to C, and three terminals 10 shall be connected to the communication network 40. Incidentally, a process of the respective terminals 10 at the locations that participate in the communication logging in to the video conference system and a process of establishing a session for performing the communication among the terminals 10 at the locations can be performed by using publicly-known technology, such as the one disclosed in Japanese Laid-open Patent Publication No. 2014-209299, so detailed description of these processes is omitted here.

The terminals 10 transmit/receive data among them, and control the output of received data. Data handled here is an image at each location taken by a camera, voice at the location picked up by a microphone, etc. The image at the location taken by the camera is transmitted to the other locations via the communication network 40, and is displayed on respective display devices connected to the terminals 10 at the other locations. The voice at the location picked up by the microphone is transmitted to the other locations via the communication network 40, and is output from respective speakers built into the terminals 10 at the other locations. The data transmission among the terminals 10 at the locations is relayed by the relay device 30. That is, data transmitted from one terminal 10 is received by the relay device 30, and the relay device 30 transfers the received data to the other terminals 10. Incidentally, the terminals 10 can be a dedicated terminal for the video conference system, or can be a general-purpose terminal such as a personal computer (PC), a smartphone, or a tablet terminal. Such a general-purpose terminal realizes the function of the terminal 10 by installing a terminal program to be described later thereon as one of applications.

The communication control device 20 is a server computer that administers the quality control of video and voice data transmitted/received among the terminals 10 at the locations. The communication control device 20 conducts the quality control of data transmitted/received among the terminals 10 at the locations so that efficient data transmission is achieved to perform communication smoothly among the terminals 10 at the locations according to the network bandwidth of the communication network 40. Specifically, the communication control device 20 acquires respective pieces of status information which represent the operating state of the terminal 10 at each location, and determines the type of communication (hereinafter, referred to as "communication type") on the basis of a combination of the acquired pieces of status information. Then, the communication control device 20 acquires reception information (for example, the packet loss rate) which represents the state of the communication network 40 when the terminal 10 at each location has received data, and determines quality parameters (for example, the resolution of video, the frame rate, etc.) relating to the quality of data that the terminal 10 at each location transmits or receives on the basis of the determined communication type and the reception information, and then notifies the relay device 30 of the determined quality parameters.

The relay device 30 is a server computer that relays the transmission of video and voice data among the terminals 10 at the locations. In the present embodiment, video data that the terminal 10 at each location transmits shall be encoded in a scalable encoding format, such as H.264/SVC format. The relay device 30 has a function of, with respect to each data that the terminal 10 at each location has requested to receive, converting data transmitted from the transmitting-side terminal 10 into data with the quality indicated by the quality parameters notified by the communication control device 20 and transferring the data to the receiving-side terminals 10.

Figure 2:
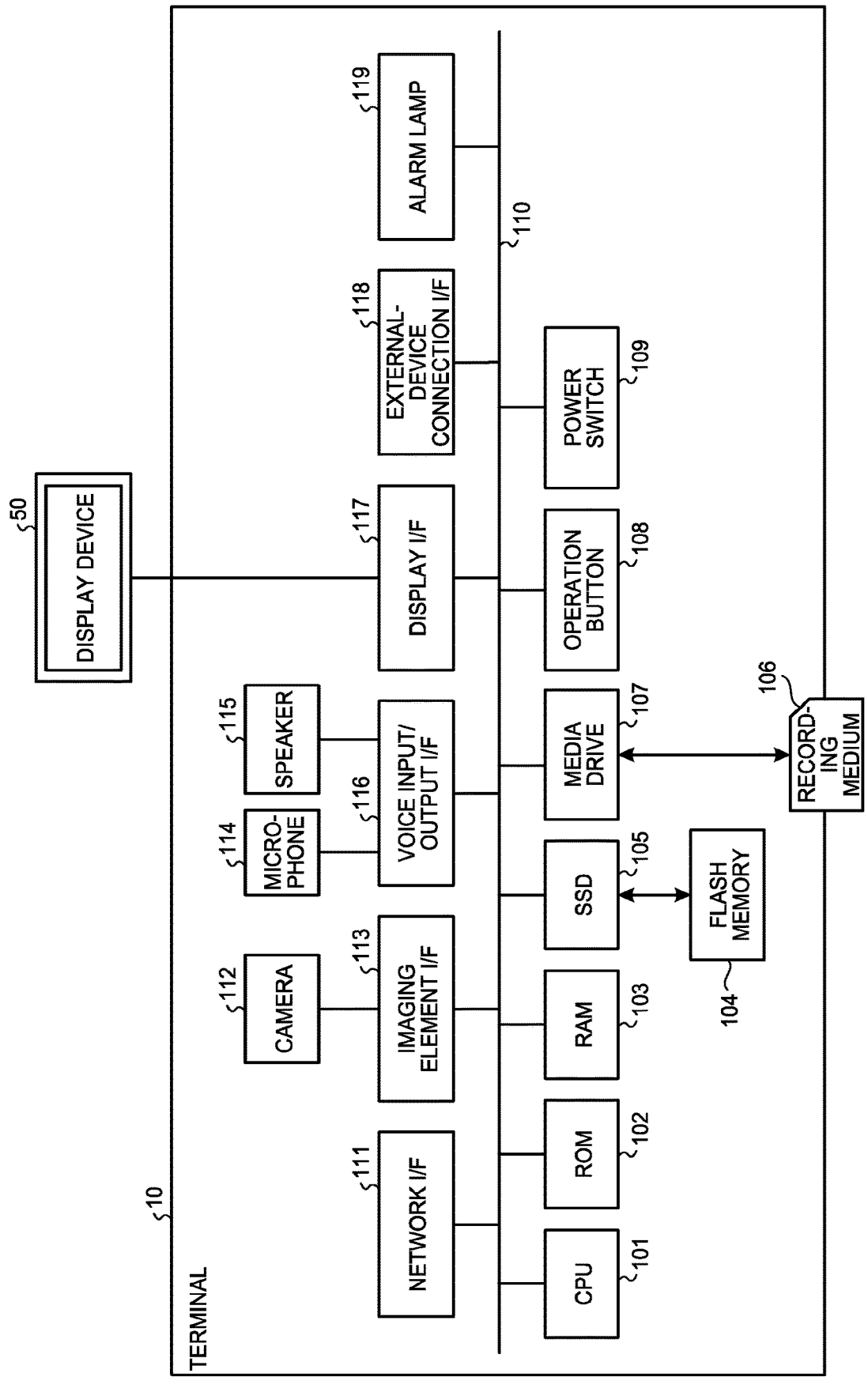
FIG. 2 is a block diagram illustrating an example of a hardware configuration of a terminal.
Figure 3:
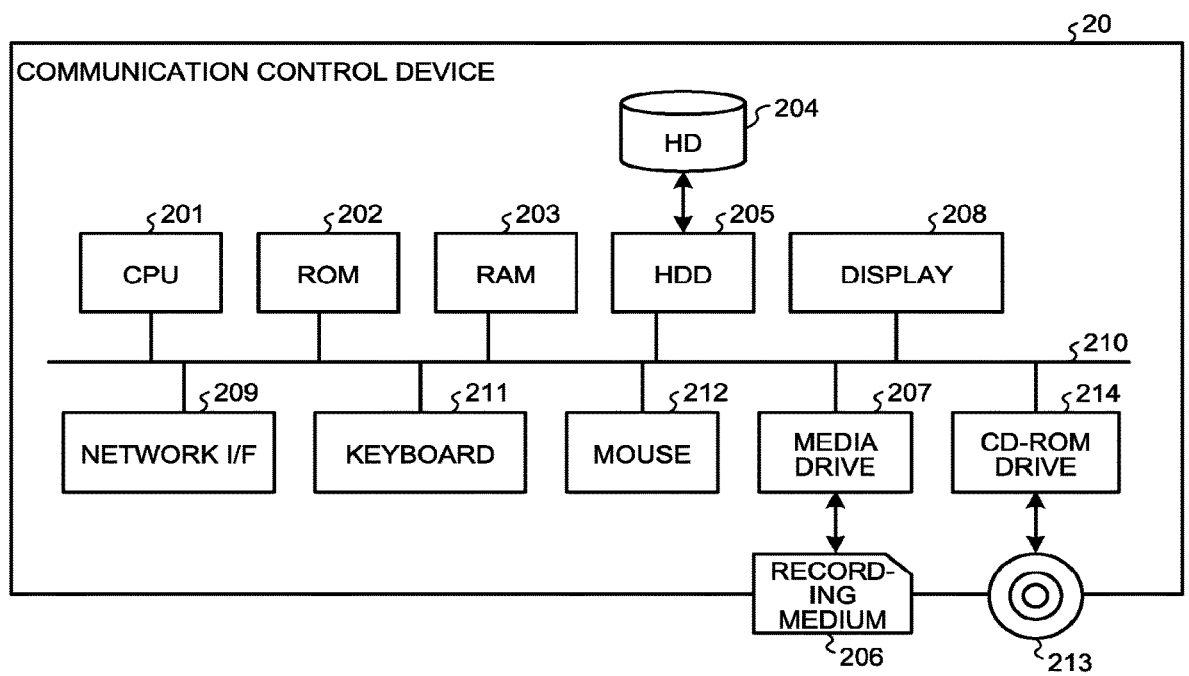
FIG. 3 is a block diagram illustrating an example of a hardware configuration of a communication control device.

Subsequently, respective hardware configurations of the terminals 10 and the communication control device 20 in the video conference system according to the present embodiment are explained. Incidentally, a hardware configuration of the relay device 30 is the same as that of the communication control device 20, so the illustration and description are omitted. FIG. 2 illustrates an example of a hardware configuration of a terminal 10; FIG. 3 illustrates an example of a hardware configuration of the communication control device 20.

As illustrated in FIG. 2, the terminal 10 includes a central processing unit (CPU) 101 that controls the operation of the entire terminal 10; a read-only memory (ROM) 102 that stores therein a program such as an initial program loader (IPL) used to drive the CPU 101; a random access memory (RAM) 103 used as a work area of the CPU 101; a flash memory 104 that stores therein the terminal program and various data such as image data and voice data; a solid state drive (SSD) 105 that controls the read and write of various data to the flash memory 104 in accordance with the control of the CPU 101; a media drive 107 that controls the read and write (storage) of data to a recording medium 106, such as a flash memory; an operation button 108 that is operated, for example, when a user selects another terminal 10 to communicate with; a power switch 109 for switching the power to the terminal 10 on/off; and a network interface (I/F) 111 for transmitting data using the communication network 40.

The terminal 10 further includes a built-in camera 112 that takes an image of a subject and obtains image data in accordance with the control of the CPU 101; an imaging element I/F 113 that controls the driving of the camera 112; a built-in microphone 114 that inputs voice; a built-in speaker 115 that outputs voice; a voice input/output I/F 116 that processes the input/output of a voice signal between the microphone 114 and the speaker 115 in accordance with the control of the CPU 101; a display I/F 117 that transmits video data to be displayed on a display device 50 in accordance with the control of the CPU 101; an external-device connection I/F 118 for connecting various external devices to the terminal 10; an alarm lamp 119 that signals a malfunction of the functions of the terminal 10; and a bus line 110, such as an address bus or a data bus, for electrically connecting the above-mentioned components.

The display device 50, which displays thereon a video and a variety of information, is assumed to be external projection equipment, such as a liquid crystal panel or a projector, attached to the terminal 10; however, the display device 50 can be configured to be built into the terminal 10. Incidentally, the hardware configuration of the terminal 10 illustrated in FIG. 2 is just an example, and other hardware other than the above can be added to the terminal 10.

The above-mentioned terminal program is stored, for example, in the flash memory 104, and is read onto the RAM 103 and executed in accordance with the control of the CPU 101. Incidentally, the terminal program can be stored in any memory, as long as it is a non-volatile memory; therefore, storage of the terminal program is not limited to the flash memory 104, and, for example, an electrically erasable and programmable ROM (EEPROM) can be used. Alternatively, the terminal program can be provided in such a manner that the terminal program is recorded on a computer-readable recording medium, such as the recording medium 106, in an installable or executable file format. Furthermore, the terminal program can be provided as a built-in program stored in the ROM 102 or the like in advance.

As illustrated in FIG. 3, the communication control device 20 includes a CPU 201 that controls the operation of the entire communication control device 20; a ROM 202 that stores therein a program such as an IPL used to drive the CPU 201; a RAM 203 used as a work area of the CPU 201; a hard disc (HD) 204 that stores therein various data, such as a communication control program; an HD drive (HDD) 205 that controls the read or write of various data to the HD 204 in accordance with the control of the CPU 201; a media drive 207 that controls the read and write (storage) of data to a recording medium 206, such as a flash memory; a display 208 that displays thereon a variety of information; a network I/F 209 for transmitting data using the communication network 40; a keyboard 211; a mouse 212; a CD-ROM drive 214 that controls the read or write of various data to a compact disc read-only memory (CD-ROM) 213 as an example of removable recording media; and a bus line 210, such as an address bus or a data bus, for electrically connecting the above-mentioned components.

The above-mentioned communication control program is stored, for example, in the HD 204, and is read onto the RAM 203 and executed in accordance with the control of the CPU 201. Alternatively, the communication control program can be provided in such a manner that the communication control program is recorded on a computer-readable recording medium, such as the recording medium 206 or the CD-ROM 213, in an installable or executable file format. Furthermore, the communication control program can be provided as a built-in program stored in the ROM 202 or the like in advance.

Incidentally, other examples of the removable recording media include computer-readable recording media such as a compact disc recordable (CD-R), a digital versatile disk (DVD), and a Blu-ray Disc. The above-mentioned programs can be recorded on these recording media and provided.

Figures 4, 5:
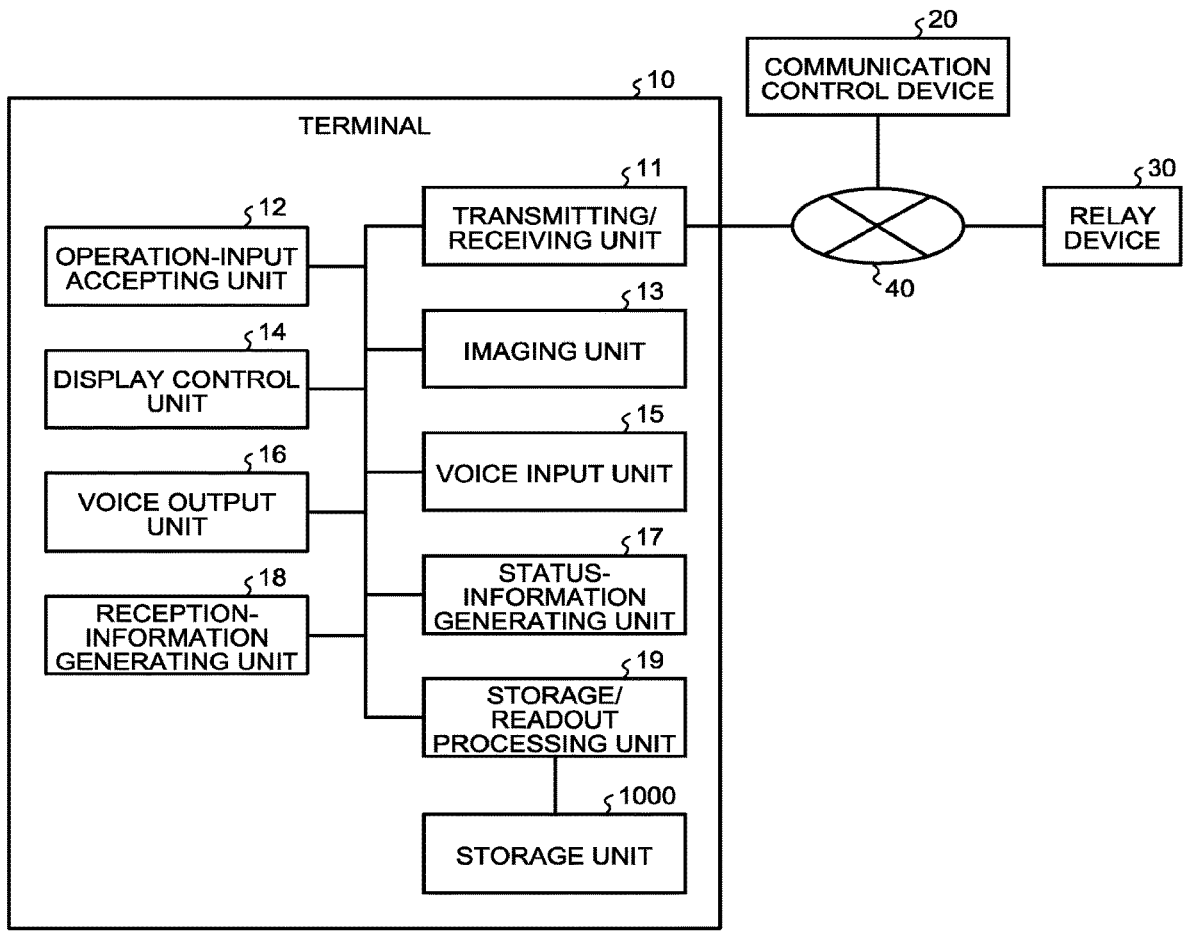
FIG. 4 is a block diagram illustrating a functional configuration example of the terminal.
FIG. 5 is a diagram illustrating an example of status information.

Subsequently, a functional configuration of the terminal 10 is explained. FIG. 4 is a block diagram illustrating a functional configuration example of the terminal 10. As illustrated in FIG. 4, the terminal 10 includes a transmitting/receiving unit 11, an operation-input accepting unit 12, an imaging unit 13, a display control unit 14, a voice input unit 15, a voice output unit 16, a status-information generating unit 17, a reception-information generating unit 18, and a storage/readout processing unit 19. These units are functions realized by the CPU 101 executing the terminal program expanded onto the RAM 103 from, for example, the flash memory 104 illustrated in FIG. 2. Furthermore, the terminal 10 includes a storage unit 1000 composed of, for example, the RAM 103 and the flash memory 104 illustrated in FIG. 2.

In the storage unit 1000, for example, unique information such as the identification information or IP address assigned to the terminal 10, information required for performing communication with another terminal 10, etc. are stored. Furthermore, the storage unit 1000 is also used as a receive buffer that temporarily holds therein the video and voice data transmitted from a terminal 10 at another location via the relay device 30.

The transmitting/receiving unit 11 transmits/receives various data to/from the communication control device 20 and the relay device 30 via the communication network 40. The transmitting/receiving unit 11 is realized, for example, by the network I/F 111 and the CPU 101 illustrated in FIG. 2.

The operation-input accepting unit 12 accepts various operation inputs made by a user who uses the terminal 10. The operation-input accepting unit 12 is realized, for example, by the operation button 108, the power switch 109, and the CPU 101 illustrated in FIG. 2.

The imaging unit 13 takes a video at a location where the terminal 10 is placed. The video taken by the imaging unit 13 is encoded in a scalable encoding format, such as H.264/SVC format, and is transmitted to the relay device 30 through the transmitting/receiving unit 11. Incidentally, the format of video data is not limited to H.264/SVC format, and may be other formats such as H.264/AVC, H.265, and Web Real-Time Communication (WebRTC). The imaging unit 13 is realized, for example, by the camera 112, the imaging element I/F 113, and the CPU 101 illustrated in FIG. 2.

The display control unit 14 performs a drawing process, etc. using a video at another location that the transmitting/receiving unit 11 has received and decoded, and delivers the processed data to the display device 50, thereby displaying a screen including the video at another location on the display device 50. The display control unit 14 is realized, for example, by the display I/F 117 and the CPU 101 illustrated in FIG. 2.

The voice input unit 15 inputs voice at the location where the terminal 10 is placed. The voice input by the voice input unit 15 is encoded in an arbitrary encoding format, such as pulse code modulation (PCM), and is transmitted to the relay device 30 through the transmitting/receiving unit 11. The voice input unit 15 is realized, for example, by the microphone 114, the voice input/output I/F 116, and the CPU 101 illustrated in FIG. 2.

The voice output unit 16 reproduces and outputs voice at another location that the transmitting/receiving unit 11 has received and decoded. The voice output unit 16 is realized, for example, by the speaker 115, the voice input/output I/F 116, and the CPU 101 illustrated in FIG. 2.

The status-information generating unit 17 generates status information which represents the operating state of the terminal 10. The operating state of the terminal 10 here is, for example, whether the microphone 114 is on or off; whether the camera 112 is on or off; whether a screen-sharing function, which is a function of displaying common data such as PC data on respective display devices 50 at multiple locations simultaneously, is used or not; and whether the screen layout of a display screen is a single-display to display a video at only one location or a multi-display to display videos at multiple locations. The status-information generating unit 17 collects these pieces of information, for example, from the imaging unit 13, the voice input unit 15, the display control unit 14, etc. and generates status information.

FIG. 5 is a diagram illustrating an example of the status information. The status information is generated as information described in markup language, such as an HTML format or an XML format. Incidentally, the expression format of the status information is not limited to these, and may be any format that the communication control device 20 can interpret. Furthermore, the status information illustrated in FIG. 5 as an example includes the microphone status enclosed in microphone tags, the camera status enclosed in camera tags, the screen-sharing status enclosed in share tags, and the screen layout status enclosed in layout tags; however, the status information only needs to include at least the status used for determination of the communication type.

The status information generated by the status-information generating unit 17 is transmitted to the communication control device 20 through the transmitting/receiving unit 11. The generation of status information and transmission of the generated status information to the communication control device 20 by the status-information generating unit 17 are repeatedly performed, for example, at predetermined intervals. Alternatively, the status-information generating unit 17 can be configured to detect a change in the operating state of the terminal 10, generate new status information when the operating state of the terminal 10 has changed, and transmit the newly-generated status information to the communication control device 20 through the transmitting/receiving unit 11. The status-information generating unit 17 is realized, for example, by the CPU 101 illustrated in FIG. 2.

The reception-information generating unit 18 generates reception information which represents the state of the communication network 40 when the terminal 10 has received data. The state of the communication network 40 when the terminal 10 has received data here is, for example, the packet loss rate which is the ratio of the number of lost packets to the number of packets of the whole data, a delay time of the received data, etc. In the present embodiment, the packet loss rate shall be treated as reception information. The packet loss rate can be acquired, for example, by a method disclosed in Japanese Patent No. 5402389. Besides the method disclosed in Japanese Patent No. 5402389, the packet loss rate can be acquired by various methods used in publicly-known bandwidth throttling technologies.

The reception information generated by the reception-information generating unit 18 is transmitted to the communication control device 20 through the transmitting/receiving unit 11. The generation of reception information and transmission of the generated reception information to the communication control device 20 by the reception-information generating unit 18 are repeatedly performed, for example, at predetermined intervals after the transmitting/receiving unit 11 has started receiving data. Alternatively, it can be configured that the reception-information generating unit 18 monitors the packet loss rate of data received by the transmitting/receiving unit 11, and, when the packet loss rate has changed by a predetermined amount, the status-information generating unit 17 detects a change in the operating state of the terminal 10, and the reception-information generating unit 18 newly generates reception information when the operating state of the terminal 10 has changed, and transmits the newly-generated reception information to the communication control device 20 through the transmitting/ receiving unit 11. The reception-information generating unit 18 is realized, for example, by the CPU 101 illustrated in FIG. 2.

The storage/readout processing unit 19 performs a process of storing various data in the storage unit 1000 or reading data out from the storage unit 1000. The storage/readout processing unit 19 is realized, for example, by the SSD 105 and the CPU 101 illustrated in FIG. 2.

Figure 6:
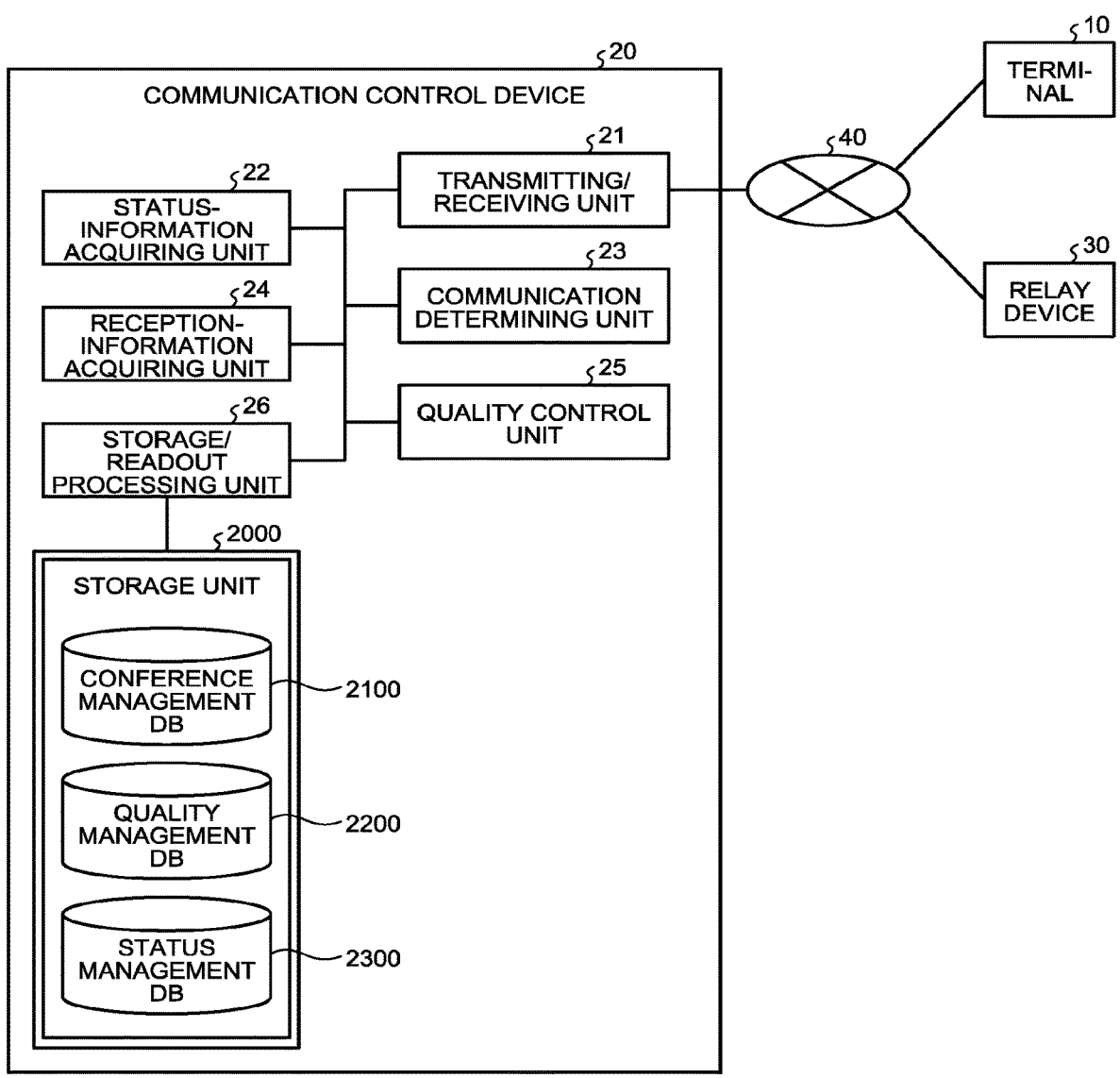
FIG. 6 is a block diagram illustrating a functional configuration example of the communication control device.

Subsequently, a functional configuration of the communication control device 20 is explained. FIG. 6 is a block diagram illustrating a functional configuration example of the communication control device 20. As illustrated in FIG. 6, the communication control device 20 includes a transmitting/receiving unit 21, a status-information acquiring unit 22, a communication determining unit 23, a reception-information acquiring unit 24, a quality control unit 25, and a storage/readout processing unit 26. These units are functions realized by the CPU 201 executing the communication control program expanded onto the RAM 203 from, for example, the HD 204 illustrated in FIG. 3. Furthermore, the communication control device 20 includes a storage unit 2000 composed of, for example, the HD 204 illustrated in FIG. 3.

Figure 7:
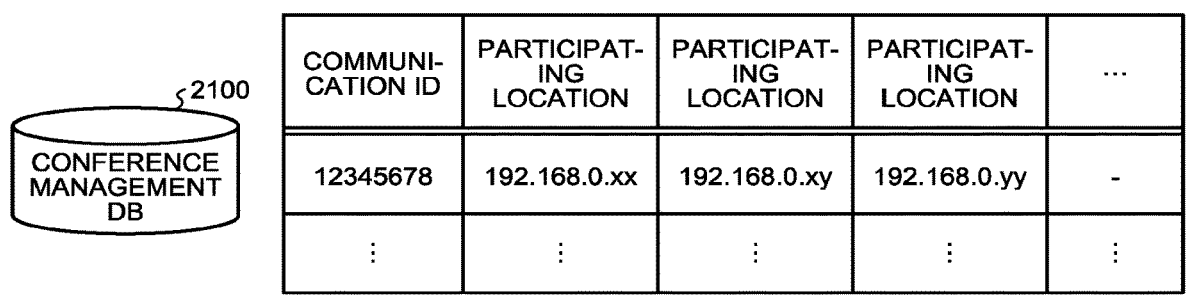
FIG. 7 is a diagram illustrating an example of a conference management table.
Figure 8:
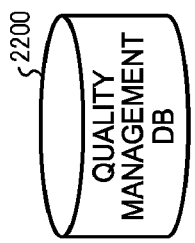
FIG. 8 is a diagram illustrating an example of a quality management table.
Figures 9A, 9B, 9C, 9D:
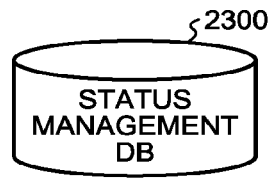
FIGS. 9A to 9D are diagrams illustrating an example of a status management table.

In the storage unit 2000, a conference management DB 2100 that stores therein a conference management table like that illustrated in FIG. 7, a quality management DB 2200 that stores therein a quality management table like that illustrated in FIG. 8, and a status management DB 2300 that stores therein a status management table like that illustrated in FIGS. 9A to 9D are created.

The conference management table stored in the conference management DB 2100 holds information on which communication (conference) and what locations participate in the communication (conference). For example, a conference management table illustrated in FIG. 7 stores therein respective IP addresses of terminals 10 at multiple locations that participate in communication to be associated with a communication ID issued when a notification of holding of the communication has been accepted from any of the terminals 10. Incidentally, in the present embodiment, each terminal 10 shall be identified by IP address; however, each terminal 10 can be identified by a unique terminal ID assigned to the terminal 10 instead of IP address. Furthermore, the terminal ID can be information that identifies a user of the terminal 10. For example, the communication control device 20 receives a notification of holding of communication including respective IP addresses of terminals 10 at multiple locations that participate in the communication from any of the terminals 10, thereby can grasp the IP addresses of the terminals 10 at the locations that participate in the communication. Alternatively, the terminals 10 can be configured to log in to the communication control device 20 so that the communication control device 20 can grasp the IP addresses of the terminals 10 before the start of the communication. The conference management table is updated each time the communication control device 20 receives a new notification of holding of communication or a notification of close of communication.

The quality management table stored in the quality management DB 2200 defines quality parameters corresponding to reception information (in the present embodiment, the packet loss rate) with respect to each communication type and each role of the terminal 10 in communication. For example, in a quality management table illustrated in FIG. 8, according to whether the communication type is one-way communication or two-way communication and, if the communication type is one-way communication, whether the role of the terminal 10 is a leading role (the information sending side) or a subordinate role (the information receiving side), the resolution and frame rate as quality parameters of the optimum video with respect to the packet loss rate of a receiving-side terminal 10 and the bit rate as a quality parameter of the optimum voice are defined. This quality management table is generated in advance through experiment to examine the relationship between data quality and packet loss rate, and is stored in the quality management DB 2200.

The status management table stored in the status management DB 2300 holds the current operating state, which is represented by the above-described status information, of the terminals 10 at the locations that participate in communication. For example, a status management table illustrated in FIGS. 9A to 9D includes (a) a table on microphone status, (b) a table on camera status, (c) a table on screen-sharing status, and (d) a table on screen layout status. These tables are generated with respect to each communication whose holding has been notified, and are deleted when the communication control device 20 has received a notification of close of the communication. Furthermore, while the communication continues, each time new status information is acquired from any terminal 10 at any of the locations that participate in the communication, a table on status included in the status information is updated.

The transmitting/receiving unit 21 transmits/receives various data to/from the terminals 10 at the locations and the relay device 30 via the communication network 40. The transmitting/receiving unit 21 is realized, for example, by the network I/F 209 and the CPU 201 illustrated in FIG. 3.

The status-information acquiring unit 22 acquires respective pieces of information transmitted from the terminals 10 at the locations that participate in the communication through the transmitting/receiving unit 21. The information acquired by the status-information acquiring unit 22 is delivered to the storage/readout processing unit 26 and stored in the status management table of the status management DB 2300. The status-information acquiring unit 22 is realized, for example, by the network I/F 209 and the CPU 201 illustrated in FIG. 3.

The communication determining unit 23 determines the communication type on the basis of a combination of the pieces of status information acquired from the terminals 10 at the locations that participate in the same communication. Furthermore, when having determined that the communication type is one-way communication, the communication determining unit 23 further determines a location taking the initiative in the communication, i.e., a location of a terminal 10 taking a leading role in the communication. The communication determining unit 23 performs the determination of the communication type in accordance with determination rules set, for example, according to the type of status information (microphone status, camera status, screen-sharing status, screen layout status).

FIGS. 10A to 10B are a diagram illustrating an example of the determination rules when the communication type is determined; FIG. 10A illustrates the determination rules corresponding to the microphone status, FIG. 10B illustrates the determination rules corresponding to the camera status, FIG. 10C illustrates the determination rules corresponding to the screen-sharing status, and FIG. 10D illustrates the determination rules corresponding to the screen layout status. These determination rules can be generated, for example, as a table in advance and stored in the storage unit 2000, or can be described in a program that realizes the communication determining unit 23 as logic that operates the communication determining unit 23. The communication determining unit 23 retrieves, for example, respective pieces of status information of the terminals 10 at the locations that participate in the communication from the quality management table stored in the quality management DB 2200, and, with respect to each type of status information, collates a combination of the status information with the determination rules, thereby can determine the communication type.

The determination rules corresponding to the microphone status in FIG. 10A define that if, of all the terminals 10 at the locations that participate in the same communication, only one terminal 10 is that the microphone 114 thereof is on, the communication type is determined to be one-way communication; otherwise, the communication type is determined to be two-way communication. Furthermore, the determination rules define that when the communication type is determined to be one-way communication, the location of the terminal 10 whose microphone 114 is on is determined to be a location taking the initiative in the communication. For example, it is assumed that the locations that participate in the communication are three locations: Location A (IP address of the terminal 10 is 192.168.0.xx), Location B (IP address of the terminal 10 is 192.168.0.xy), and Location C (IP address of the terminal 10 is 192.168.0.yy), and respective microphone status of status information acquired from the terminals 10 at the locations are that illustrated in FIG. 9A. In this case, from a combination of the microphone status illustrated FIG. 9A, it turns out that the microphone 114 of the terminal 10 only at Location A is on; therefore, the communication determining unit 23 determines that the communication type is one-way communication, and determines that a location taking the initiative in the communication is Location A.

The determination rules corresponding to the camera status in FIG. 10B define that if, of all the terminals 10 at the locations that participate in the same communication, only one terminal 10 is that the camera 112 thereof is on, the communication type is determined to be one-way communication; otherwise, the communication type is determined to be two-way communication. Furthermore, the determination rules define that when the communication type is determined to be one-way communication, the location of the terminal 10 whose camera 112 is on is determined to be a location taking the initiative in the communication. For example, it is assumed that the locations that participate in the communication are three locations: Locations A to C as with the above-described example, and respective camera status of status information acquired from the terminals 10 at the locations are that illustrated in FIG. 9B. In this case, from a combination of the camera status illustrated in FIG. 9B, it turns out that the camera 112 of the terminal 10 only at Location A is on; therefore, the communication determining unit 23 determines that the communication type is one-way communication, and determines that a location taking the initiative in the communication is Location A.

The determination rules corresponding to the screen-sharing status in FIG. 10C define that if data transmitted from any of the terminals 10 at the locations that participate in the same communication is shared among the screens of all the terminals 10 at the locations, the communication type is determined to be one-way communication; otherwise, the communication type is determined to be two-way communication. Furthermore, the determination rules define that when the communication type is determined to be one-way communication, the location of the source terminal 10 of the data shared among the screens is determined to be a location taking the initiative in the communication. For example, it is assumed that the locations that participate in the communication are three locations: Locations A to C as with the above-described example, and respective screen-sharing status of status information acquired from the terminals 10 at the locations are that illustrated in FIG. 9C. In this case, from a combination of the screen-sharing status illustrated in FIG. 9C, it turns out that data from the terminal 10 at Location A is shared among the screens; therefore, the communication determining unit 23 determines that the communication type is one-way communication, and determines that a location taking the initiative in the communication is Location A.

The determination rules corresponding to the screen layout status in FIG. 10D define that if, of all the terminals 10 at the locations that participate in the same communication, there are multiple terminals 10 at different locations that display thereon only a video from a terminal 10 at any location, the communication type is determined to be one-way communication; otherwise, the communication type is determined to be two-way communication. Furthermore, the determination rules define that when the communication type is determined to be one-way communication, the location of the source terminal 10 of the video that the multiple terminals 10 at the different locations display thereon is determined to be a location taking the initiative in the communication. For example, it is assumed that the locations that participate in the communication are three locations: Locations A to C as with the above-described example, and respective screen layout status of status information acquired from the terminals 10 at the locations are that illustrated in FIG. 9D. In this case, from a combination of the screen layout status illustrated in FIG. 9D, it turns out that the terminals 10 at Locations B and C display thereon only a video from Location A; therefore, the communication determining unit 23 determines that the communication type is one-way communication, and determines that a location taking the initiative in the communication is Location A.

Incidentally, the determination rules described above are just an example, and are not limited to the above example. For example, the communication type can be determined not by using any one of the microphone status, the camera status, the screen-sharing status, and the screen layout status included in status information alone but in accordance with determination rules using two or more of these multiply. Furthermore, it is also possible to configure to further diversify the type of status information acquired from the terminals 10 and determine the communication type to be not either one-way communication or two-way communication but any of a wider variety of types.

A result of the determination by the communication determining unit 23 is delivered to the quality control unit 25. The communication determining unit 23 is realized, for example, by the CPU 201 illustrated in FIG. 3.

The reception-information acquiring unit 24 acquires respective pieces of reception information transmitted from the terminals 10 at the locations that participate in the communication through the transmitting/receiving unit 21. The reception information acquired by the reception-information acquiring unit 24 is delivered to the quality control unit 25. This reception information is, as described above, information which represents the state of the communication network 40 when each terminal 10 has received data, and, for example, is information such as the packet loss rate when the terminal 10 has received the data. The reception-information acquiring unit 24 is realized, for example, by the network I/F 209 and the CPU 201 illustrated in FIG. 3.

The quality control unit 25 controls the quality of data transmitted/received among the terminals 10 at the locations that participate in the communication on the basis of the communication type determined by the communication determining unit 23 and the reception information acquired by the reception-information acquiring unit 24. Specifically, with reference to, for example, the quality management table stored in the quality management DB 2200 like that illustrated in FIG. 8, the quality control unit 25 determines quality parameters of data transmitted/received among the terminals 10 according to whether the communication type is one-way communication or two-way communication, whether the role of the terminal 10 is a leading role or a subordinate role, and what the packet loss rate acquired as reception information is.

For example, when the communication type has been determined to be one-way communication, quality parameters of a video from a terminal 10 taking a leading role shall be a resolution of 1920×1080 and a frame rate of 30 if the packet loss rate acquired as reception information of terminals 10 that receive the video is 0 to 1%; a resolution of 1280×720 and a frame rate of 30 if the packet loss rate is 1 to 5%. Furthermore, when the communication type has been determined to be one-way communication, quality parameters of a video from a terminal 10 taking a subordinate role shall be a resolution of 720×480 and a frame rate of 15 if the packet loss rate acquired as reception information of terminals 10 that receive the video is 0 to 1%; a resolution of 320×240 and a frame rate of 15 if the packet loss rate is 1 to 5%.

On the other hand, when the communication type has been determined to be two-way communication, quality parameters of a video from each terminal 10 shall be a resolution of 1280×720 and a frame rate of 10 if the packet loss rate acquired as reception information of terminals 10 that receive the video is 0 to 1%; a resolution of 720×480 and a frame rate of 10 if the packet loss rate is 1 to 5%.

When having determined the quality parameters of data transmitted/received among the terminals 10 at the locations that participate in the communication as described above, the quality control unit 25 notifies the relay device 30 of the determined quality parameters of each data through the transmitting/receiving unit 21 via the communication network 40. Then, the quality control unit 25 instructs the relay device 30 to convert the data transmitted from a transmitting-side terminal 10 into data with the quality indicated by the notified quality parameters and then transfer the converted data to receiving-side terminals 10 when the relay device 30 relays the transmission of the data among the terminals 10. The quality control unit 25 is realized, for example, by the CPU 201 illustrated in FIG. 3.

The storage/readout processing unit 26 performs a process of storing various data in the storage unit 2000 or reading data out from the storage unit 2000. The storage/readout processing unit 26 is realized, for example, by the HDD 205 and the CPU 201 illustrated in FIG. 3.

Figure 11:
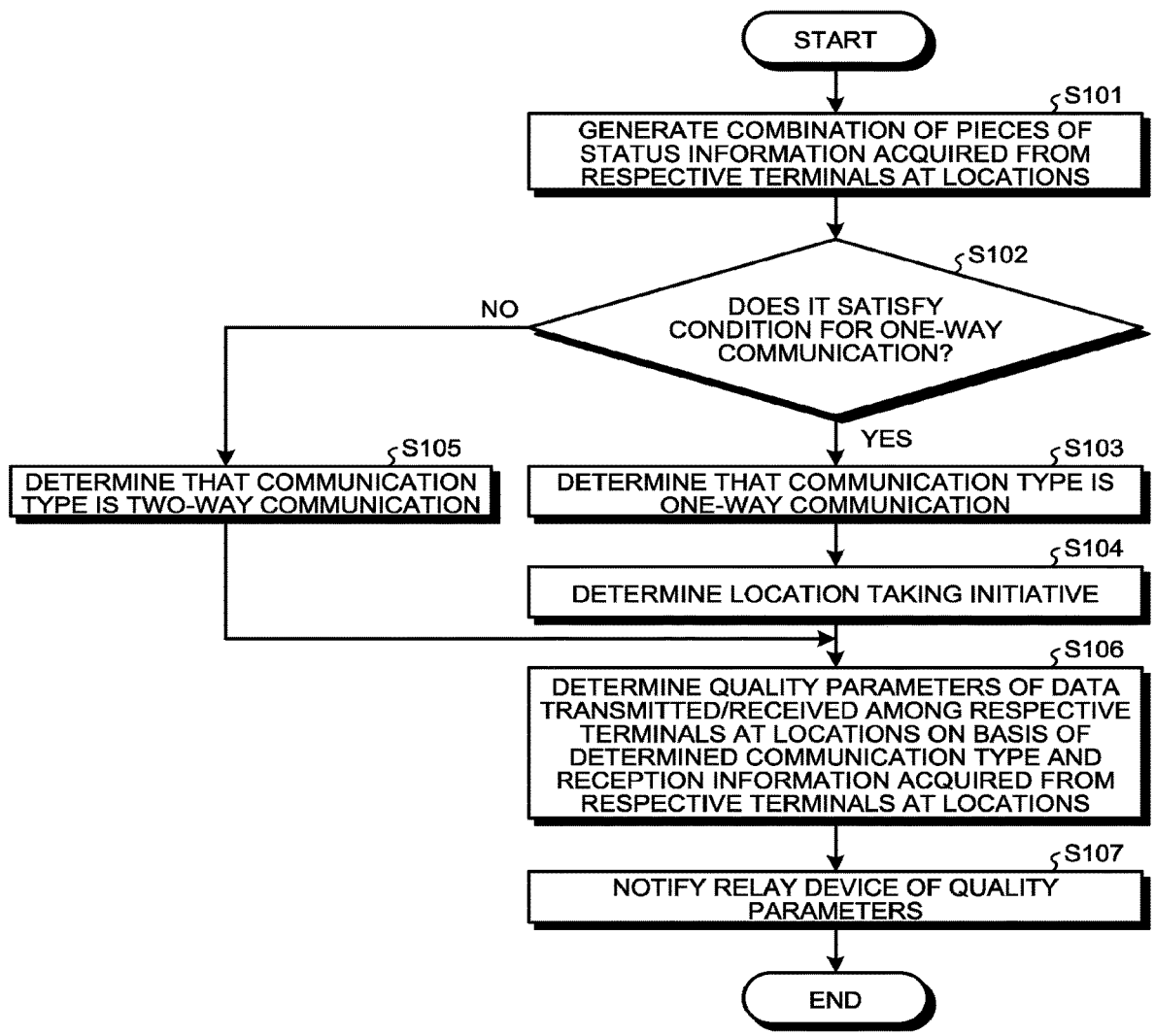
FIG. 11 is a flowchart illustrating an example of processing procedures of a communication determining unit and a quality control unit.

Here, an outline of the operations of the communication determining unit 23 and quality control unit 25 characteristic of the communication control device 20 according to the present embodiment is explained with reference to FIG. 11. FIG. 11 is a flowchart illustrating an example of processing procedures of the communication determining unit 23 and the quality control unit 25.

The communication determining unit 23 first generates a combination of pieces of status information acquired from respective terminals 10 at the locations that participate in communication (Step S101). Then, the communication determining unit 23 determines whether the combination of status information generated at Step S101 satisfies the condition for one-way communication in accordance with, for example, the determination rules illustrated in FIGS. 10A to 10D (Step S102). Here, if the combination of status information satisfies the condition for one-way communication (YES at Step S102), the communication determining unit 23 determines that the communication type is one-way communication (Step S103). Then, the communication determining unit 23 further determines a location taking the initiative in the communication in accordance with, for example, the determination rules illustrated in FIGS. 10A to 10D (Step S104). On the other hand, if the combination of status information does not satisfy the condition for one-way communication (NO at Step S102), the communication determining unit 23 determines that the communication type is two-way communication (Step S105).

After that, when respective pieces of reception information have been acquired from the terminals 10 at the locations that participate in the communication, with reference to, for example, the quality management table illustrated in FIG. 8, the quality control unit 25 determines quality parameters of data transmitted/received among the terminals 10 at the locations on the basis of the communication type determined by the communication determining unit 23 and the reception information acquired from the terminals 10 at the locations (Step S106). Then, the quality control unit 25 notifies the relay device 30 of the quality parameters determined at Step S106 (Step S107).

Figure 12:
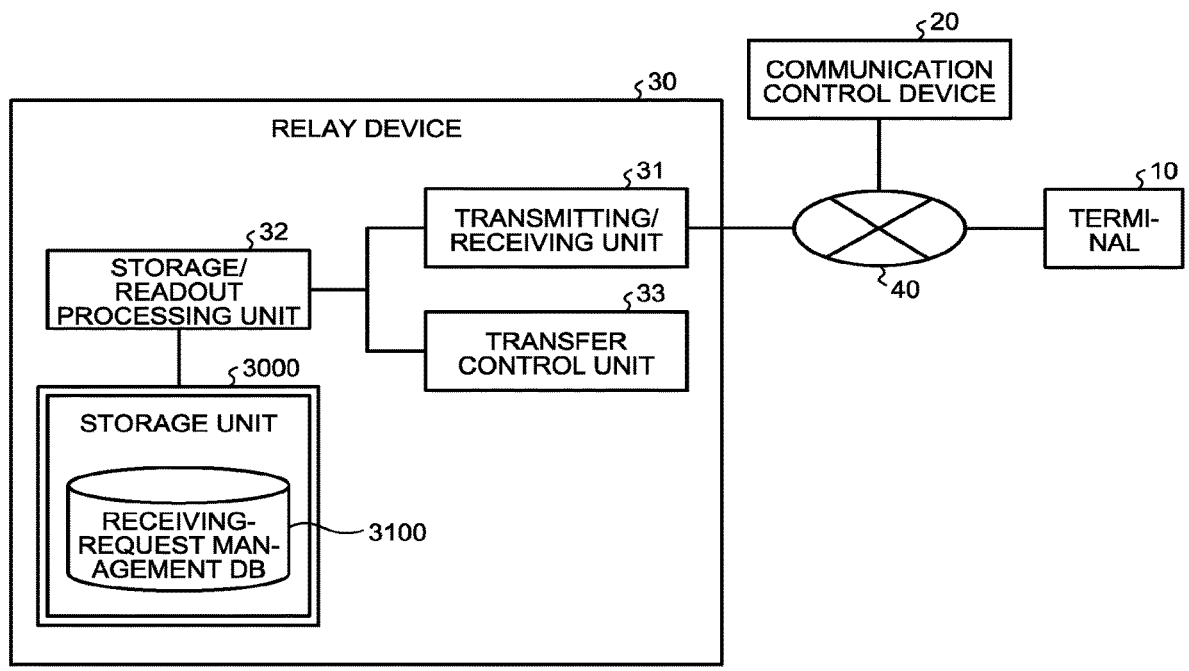
FIG. 12 is a block diagram illustrating a functional configuration example of a relay device.

Subsequently, a functional configuration of the relay device 30 is explained. FIG. 12 is a block diagram illustrating a functional configuration example of the relay device 30. As illustrated in FIG. 12, the relay device 30 includes a transmitting/receiving unit 31, a storage/readout processing unit 32, and a transfer control unit 33. These units are functions realized by the CPU 201 executing a relay device program expanded onto the RAM 203 from, for example, the HD 204 illustrated in FIG. 3. Furthermore, the relay device 30 includes a storage unit 3000 composed of, for example, the HD 204 illustrated in FIG. 3.

Figure 13:
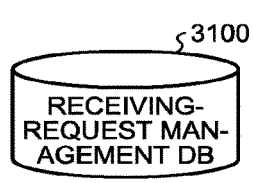
FIG. 13 is a diagram illustrating an example of a receiving-request management table.

In the storage unit 3000, a receiving-request management DB 3100 that stores therein a receiving-request management table like that illustrated in FIG. 13 is created. The receiving-request management table stored in the receiving-request management DB 3100 holds information on whether which location's terminal 10 has requested to receive data transmitted from a terminal 10 at each location together with quality parameters determined with respect to the data by the quality control unit 25 of the communication control device 20. For example, in an example of a receiving-request management table illustrated in FIG. 13, with respect to a video transmitted from each location's terminal 10, a data ID assigned to the video, IP address of a terminal 10 who has requested to receive the video, and the resolution and frame rate which are quality parameters of the video are held to be associated with one another. If multiple terminals 10 have requested to receive the same video, the resolution and frame rate which are quality parameters of data received are associated with each of the terminals 10.

Such a receiving-request management table is generated on the basis of a receiving request transmitted from a terminal 10 at each location that participates in communication and quality parameters transmitted from the communication control device 20. The receiving request is transmitted from the transmitting/receiving unit 11 of the terminal 10 to the relay device 30, for example, when a user operation input to specify data has been accepted by the operation-input accepting unit 12 of the terminal 10. The receiving-request management table is updated each time a new receiving request is transmitted from any terminal 10 to the relay device 30. Furthermore, the quality parameters of each data held in the receiving-request management table are updated each time newly-determined quality parameters are transmitted from the communication control device 20.

The transmitting/receiving unit 31 transmits/receives various data to/from the terminals 10 at the locations and the communication control device 20 via the communication network 40. The transmitting/receiving unit 31 is realized, for example, by the network I/F 209 and the CPU 201 illustrated in FIG. 3.

The storage/readout processing unit 32 performs a process of storing various data in the storage unit 3000 or reading data out from the storage unit 3000. The storage/readout processing unit 32 is realized, for example, by the HDD 205 and the CPU 201 illustrated in FIG. 3.

The transfer control unit 33 controls the transfer of data transmitted/received among the terminals 10 at the locations with reference to the receiving-request management table stored in the receiving-request management DB 3100. For example, when a scalably-encoded video has been transmitted from a terminal 10 at some location together with a data ID and received by the transmitting/receiving unit 31, the transfer control unit 33 acquires IP address of a terminal 10 who has requested to receive the video the resolution and frame rate designated with respect to the video from the receiving-request management table with the data ID as a key. Then, the transfer control unit 33 converts the scalably-encoded video into a video with the designated resolution and frame rate, and transfers the converted video addressed to the IP address of the terminal 10 who has requested to receive the video through the transmitting/receiving unit 31. Accordingly, the quality of data transmitted/received among the terminals 10 at the locations that participate in the communication can be optimized according to the communication type and the state of the data-receiving-side communication network 40. The transfer control unit 23 is realized, for example, by the network I/F 209 and the CPU 201 illustrated in FIG. 3.

Figure 14:
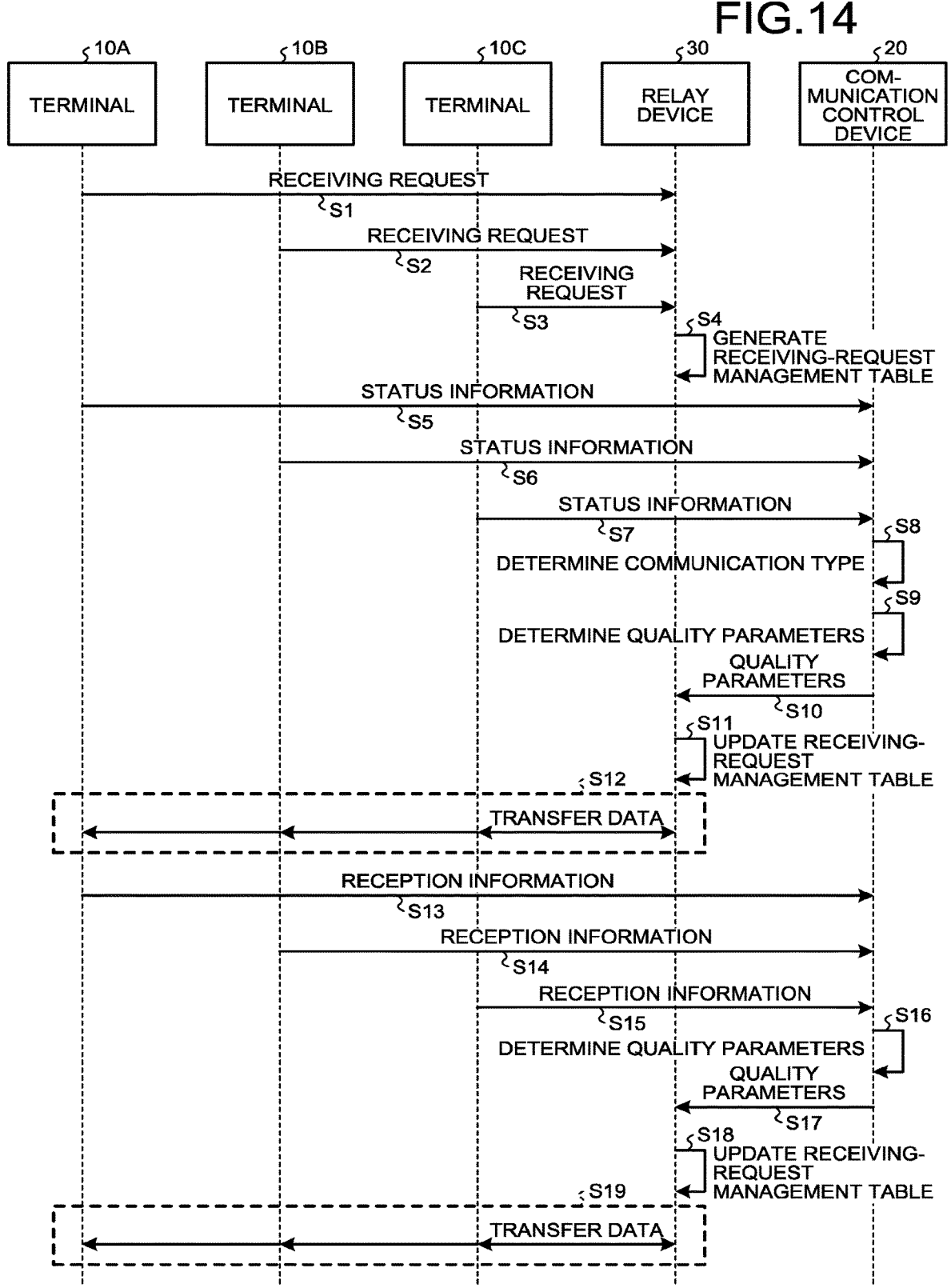
FIG. 14 is a sequence diagram for explaining the operation example of the video conference system according to the first embodiment.

Subsequently, there is described an example of the operation of the video conference system according to the present embodiment on the assumption that three locations: Locations A to C perform communication using the video conference system according to the present embodiment. FIG. 14 is a sequence diagram for explaining the operation example of the video conference system according to the present embodiment. Incidentally, here, a process of the respective terminals 10 at the locations logging in to the video conference system and a process of establishing a session for performing the transmission/receiving of data among the terminals 10 at the locations via the relay device 30 shall be already finished, and a notification of holding of the communication shall have been sent to the communication control device 20. Furthermore, here, the terminal 10 at Location A, the terminal 10 at Location B, and the terminal 10 at Location C are referred to as "the terminal 10A", "the terminal 10B", and "the terminal 10C", respectively.

First, the terminal 10A, the terminal 10B, and the terminal 10C that participate in the communication each transmit a receiving request with designation of data requested to receive at their own location to the relay device 30 (Steps S1, S2, S3). Upon these receiving requests from the terminals 10A, 10B, and 10C, the relay device 30 generates a receiving-request management table (Step S4).

After that, the terminals 10A, 10B, and 10C that participate in the communication each transmit status information which represents the operating state to the communication control device 20 (Steps S5, S6, S7). When having acquired the respective pieces of status information from the terminals 10A, 10B, and 10C, the communication control device 20 determines the communication type on the basis of a combination of the acquired status information (Step S8). Then, the communication control device 20 determines quality parameters of data transmitted/received among the terminals 10A, 10B, and 10C according to the determined communication type (Step S9). At this time, the terminals 10A, 10B, and 10C have not yet started the transmission/receiving of data; therefore, assuming that the packet loss rates in all the terminals 10A, 10B, and 10C are 0%, the communication control device 20 determines quality parameters of data transmitted/received among the terminals 10A, 10B, and 10C. Then, the communication control device 20 notifies the relay device 30 of the determined quality parameters (Step S10).

When having been notified of the quality parameters with respect to data transmitted/received among the terminals 10A, 10B, and 10C from the communication control device 20, the relay device 30 applies the notified quality parameters to the receiving-request management table generated at Step S4 and updates the receiving-request management table (Step S11). Then, when the terminals 10A, 10B, and 10C have started the transmission/receiving of data, the relay device 30 converts data that any of the terminals 10A, 10B, and 10C has transmitted into data with the designated quality using the receiving-request management table updated at Step S11 and transfers the converted data to a terminal who has requested to receive the data (Step S12).

After that, the terminals 10A, 10B, and 10C each transmit reception information (the packet loss rate) which represents the state of the communication network 40 when the terminal 10 has actually received the data to the communication control device 20 (Steps S13, S14, S15). When having acquired the respective pieces of reception information from the terminals 10A, 10B, and 10C, the communication control device 20 newly determines quality parameters of data transmitted/received among the terminals 10A, 10B, and 10C according to the acquired reception information and the communication type already determined at Step S8 (Step S16). Then, the communication control device 20 notifies the relay device 30 of the determined quality parameters (Step S17).

When having been notified of the quality parameters with respect to data transmitted/received among the terminals 10A, 10B, and 10C from the communication control device 20, the relay device 30 applies the notified quality parameters to the receiving-request management table and updates the receiving-request management table (Step S18). Then, the relay device 30 converts data that any of the terminals 10A, 10B, and 10C has transmitted into data with the designated quality using the receiving-request management table updated at Step S18 and transfers the converted data to a terminal who has requested to receive the data (Step S19).

After that, each time reception information is newly transmitted to the communication control device 20 from the terminals 10A, 10B, and 10C, the determination of quality parameters by the communication control device 20 and the update of the receiving-request management table by the relay device 30 are repeatedly performed, the quality of data transmitted/received among the terminals 10A, 10B, and 10C is updated as needed according to the state of the communication network 40. Furthermore, when status information has been newly transmitted to the communication control device 20 from the terminals 10A, 10B, and 10C, the determination of the communication type and quality parameters by the communication control device 20 and the update of the receiving-request management table by the relay device 30 are performed, the quality of data transmitted/received among the terminals 10A, 10B, and 10C is changed with the change in communication type.

As explained in detail above with concrete examples given, in the video conference system according to the present embodiment, the communication type is determined on the basis of a combination of respective pieces of status information which represent the respective operating states of the terminals 10 at the locations that participate in communication. Then, on the basis of the determined communication type and respective pieces of reception information which represent the states of the communication network 40 when the terminals 10 at the locations that participate in the communication have received data, the quality of data transmitted/received among the terminals 10 at the locations is controlled. Therefore, according to the video conference system according to the present embodiment, it is possible to achieve the appropriate quality control according to the network bandwidth while lessening user's operation burden.

(Variation 1)

Incidentally, in the first embodiment described above, the communication control device 20 is configured to notify the relay device 30 of determined quality parameters of data transmitted/received among the terminals 10 at the locations when having determined the quality parameters. Alternatively, the communication control device 20 can be configured to notify the source terminal 10 of the data directly or via the relay device 30 of the determined quality parameters. In this case, the terminal 10 at each location just has to transmit data with the quality notified by the communication control device 20.

(Variation 2)

Furthermore, in the first embodiment described above, the terminals 10 at the locations are configured to directly transmit status information and reception information to the communication control device 20. Alternatively, it can be configured that the relay device 30 temporarily aggregates respective pieces of status information and reception information transmitted from the terminals 10 at the locations, and the communication control device 20 acquires the status information and reception information aggregated by the relay device 30.

(Variation 3)

Moreover, in the first embodiment described above, the communication control device 20 and the relay device 30 are configured to be separate devices. Alternatively, the communication control device 20 and the relay device 30 can be configured to be combined into one device by letting the communication control device 20 have the functions of the relay device 30 or letting the relay device 30 have the functions of the communication control device 20.

Second Embodiment

Figure 15:
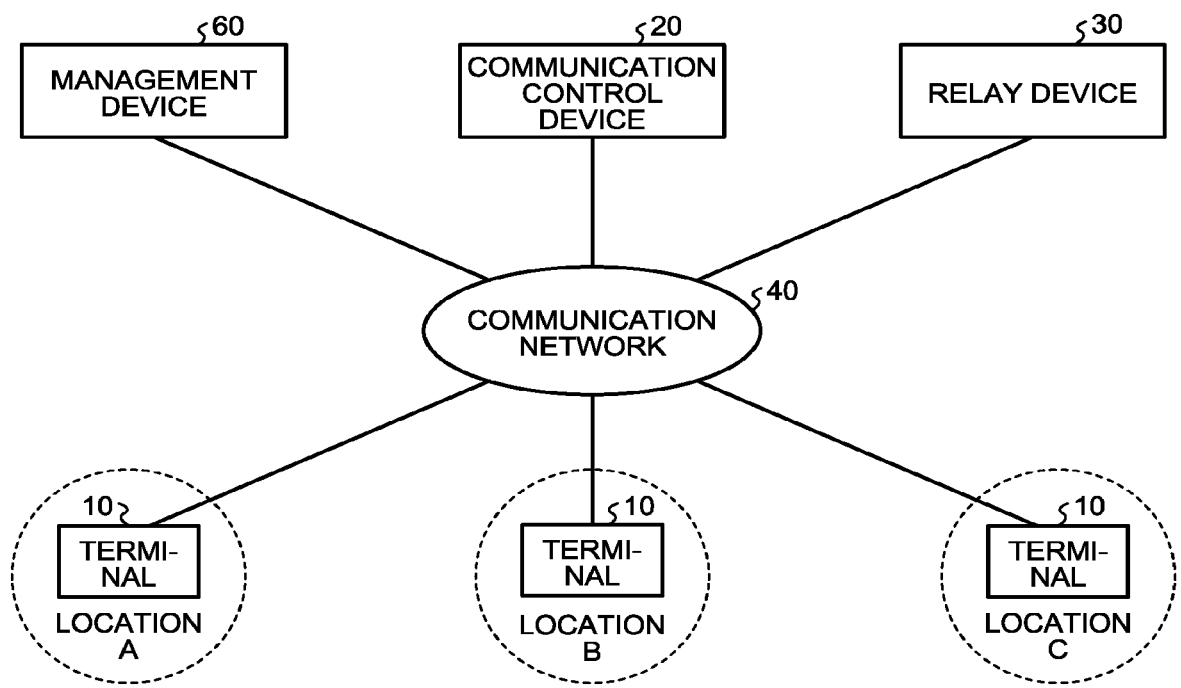
FIG. 15 is a schematic configuration diagram of a video conference system according to a second embodiment.

FIG. 15 is a schematic configuration diagram of a video conference system according to a second embodiment. As illustrated in FIG. 15, the video conference system according to the present embodiment further includes a management device 60 in addition to the configuration of the video conference system according to the above-described first embodiment (see FIG. 1). In the following, only the difference from the first embodiment is described.

The management device 60 is a server computer that manages the overall video conference system according to the present embodiment. For example, the management device 60 performs an authentication process when each terminal 10 logs in to the system, reception of a notification of holding or close of communication, management of communication currently being held, management of the state of each terminal 10, etc. A hardware configuration of the management device 60 is the same as, for example, that of the communication control device 20 illustrated in FIG. 3, so the illustration and description are omitted.

Figure 16:
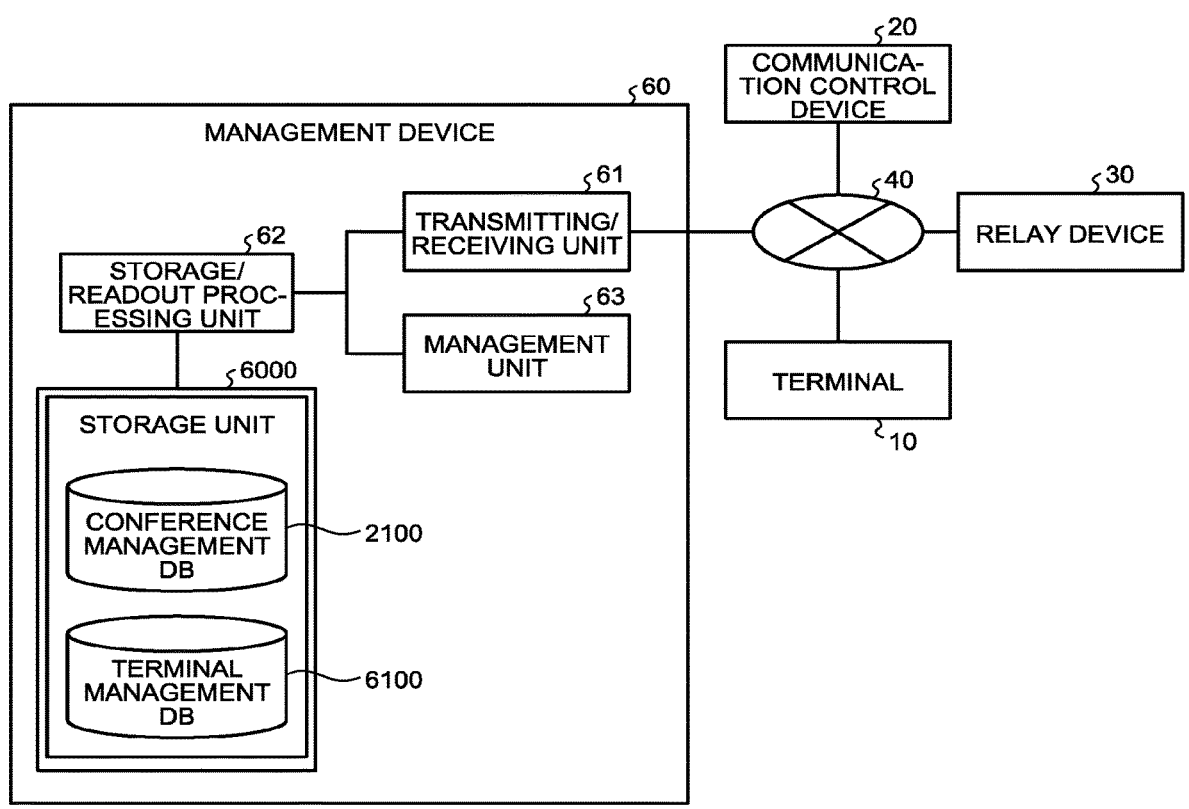
FIG. 16 is a block diagram illustrating a functional configuration example of a management device.

FIG. 16 is a block diagram illustrating a functional configuration example of the management device 60. As illustrated in FIG. 16, the management device 60 includes a transmitting/receiving unit 61, a storage/readout processing unit 62, and a management unit 63. These units are functions realized by the CPU 201 executing a management device program expanded onto the RAM 203 from, for example, the HD 204 illustrated in FIG. 3. Furthermore, the management device 60 includes a storage unit 6000 composed of, for example, the HD 204 illustrated in FIG. 3.

Figure 17:
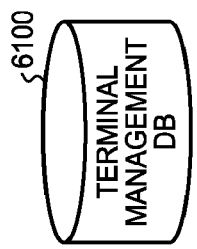
FIG. 17 is a diagram illustrating an example of a terminal management table.

In the storage unit 6000, the conference management DB 2100 that stores therein a conference management table like that illustrated in FIG. 7 and a terminal management DB 6100 that stores therein a terminal management table like that illustrated in FIG. 17 are created. In the above-described first embodiment, the conference management DB 2100 is created in the storage unit 2000 of the communication control device 20; however, in the present embodiment, the management device 60 performs the management of communication currently being held, so the conference management DB 2100 is created in the storage unit 6000 of the management device 60.

The terminal management table stored in the terminal management DB 6100 holds information for managing the states of all the terminals 10 registered as a terminal 10 used in the video conference system according to the present embodiment. For example, in a terminal management table illustrated in FIG. 17, the current operating state, IP address, and status information such as microphone status and camera status of each terminal 10 are stored to be associated with terminal name of the terminal 10. The terminal management table is updated each time a new terminal 10 is registered or each time a change in the operating state of the terminal 10 or new status information is notified.

The transmitting/receiving unit 61 transmits/receives various data to/from the terminals 10, the communication control device 20, and the relay device 30 via the communication network 40. The transmitting/receiving unit 61 is realized, for example, by the network I/F 209 and the CPU 201 illustrated in FIG. 3.

The storage/readout processing unit 62 performs a process of storing various data in the storage unit 6000 or reading data out from the storage unit 6000. The storage/readout processing unit 62 is realized, for example, by the HDD 205 and the CPU 201 illustrated in FIG. 3.

The management unit 63 performs a process of updating the conference management table in response to a notification of holding or close of communication, a process of updating the terminal management table in response to a change in the operating state of a terminal 10 or a notification of status information, etc. The management unit 63 is realized, for example, by the CPU 201 illustrated in FIG. 3.

The video conference system according to the present embodiment has a configuration in which the management device 60 manages the status information such as microphone status and camera status of each terminal 10. Therefore, each terminal 10 transmits status information to not the communication control device 20 but the management device 60. Then, the communication control device 20 acquires respective pieces of status information of terminals 10 at locations that participate in communication from the management device 60 when the communication control device 20 determines the communication type. Then, the communication control device 20 determines the communication type on the basis of a combination of the status information acquired from the management device 60. The other operation in the video conference system according to the present embodiment is the same as that in the first embodiment.

As described above, also in the video conference system according to the present embodiment, the communication type is determined on the basis of a combination of respective pieces of status information acquired from terminals 10 at locations that participate in communication, and the quality of data transmitted/received among the terminals 10 at the locations is controlled on the basis of the determined communication type and respective pieces of reception information acquired from the terminals 10 at the locations. Therefore, as with the first embodiment, it is possible to achieve the appropriate quality control according to the network bandwidth while lessening user's operation burden. Furthermore, in the present embodiment, the management of communication is performed by not the communication control device 20 but the management device 60; therefore, the load is distributed, so the operation of the video conference system can be efficiently performed.

(Variation 1)

Incidentally, in the second embodiment described above, the communication control device 20 is configured to notify the relay device 30 of determined quality parameters of data transmitted/received among the terminals 10 at the locations when having determined the quality parameters. Alternatively, the communication control device 20 can be configured to notify the source terminal 10 of the data directly or via the relay device 30 of the determined quality parameters. In this case, the terminal 10 at each location just has to transmit data with the quality notified by the communication control device 20.

(Variation 2)

Furthermore, in the second embodiment described above, the communication control device 20, the relay device 30, and the management device 60 are configured to be separate devices. Alternatively, the communication control device 20 and the relay device 30 can be configured to be combined into one device, or the communication control device 20 and the management device 60 can be configured to be combined into one device.

Third Embodiment

Figure 18:
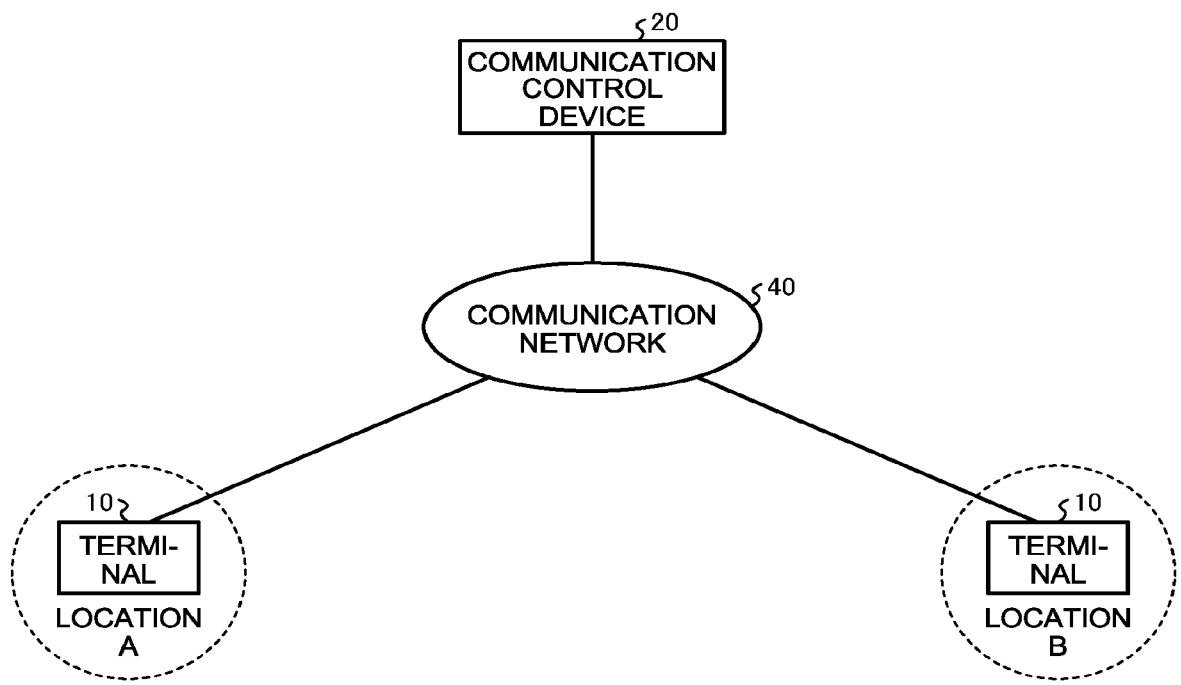
FIG. 18 is schematic configuration diagram of a video conference system according to a third embodiment.

FIG. 18 is a schematic configuration diagram of a video conference system according to a third embodiment. As illustrated in FIG. 18, the video conference system according to the present embodiment is an example in which communication is performed between two locations: Location A and Location B; the above-described relay device 30 is unnecessary. That is, in the present embodiment, the terminal 10 at Location A and the terminal 10 at Location B directly transmit/receive data between them without involving the relay device 30.

Also in the present embodiment, the communication control device 20 determines the type of communication performed between the two locations: Location A and Location B on the basis of a combination of status information acquired from the terminal 10 at Location A and status information acquired from the terminal 10 at Location B. Then, quality parameters of data transmitted/received between the two terminals 10 are determined on the basis of the determined communication type and respective pieces of reception information acquired from the terminal 10 at Location A and the terminal 10 at Location B. However, in the present embodiment, the communication control device 20 notifies the terminal 10 at Location A and the terminal 10 at Location B of the determined quality parameters. The terminal 10 at Location A and the terminal 10 at Location B each transmit data in accordance with the quality parameters notified by the communication control device 20.

As described above, also in the video conference system according to the present embodiment, the communication type is determined on the basis of a combination of respective pieces of status information acquired from the terminals 10 at Locations A and B that participate in communication, and the quality of data transmitted/received between the terminals 10 at Locations A and B is controlled on the basis of the determined communication type and respective pieces of reception information acquired from the terminals 10 at Locations A and B. Therefore, as with the first and second embodiments, it is possible to achieve the appropriate quality control according to the network bandwidth while lessening user's operation burden.

(Variation 1)

Incidentally, in the third embodiment described above, the communication control device 20 is provided as a separate device from the terminal 10 at Location A and the terminal 10 at Location B; the communication control device 20 and at least either one of the terminals 10 can be configured to be combined into one device by letting the terminal 10 have the functions of the communication control device 20. Which one of the terminals 10 the functions of the communication control device 20 are given may be decided in accordance with predetermined rules, such as whichever log in to the system first.

There are described above the concrete embodiments and variations to which the present invention is applied; however, the present invention is not limited to the above embodiments and variations as-is, and can be embodied by adding various variations and modifications in implementation phase without departing from the scope of the invention. For example, in the above embodiments and variations, the video conference system is provided as an example of a communication system to which the present invention is applied; however, the present invention is not limited to this. The present invention can be effectively applied to various communication systems in which video or voice data is transmitted/received between terminals, such as a car navigation system in which map data, route information, etc. are delivered from a terminal of a management center to a car navigation device installed on a vehicle.

Furthermore, in the above embodiments, the video conference terminal is provided as an example of a terminal to which the present invention is applied; however, the present invention is not limited to this. The present invention can be effectively applied to various devices that perform communication with an external device, such as a PC, a tablet terminal, a smartphone, an electronic blackboard, a car navigation device installed on a vehicle, phone terminals such as an Internet protocol (IP) phone and an Internet phone, a wearable computer, a camera, a game console, and industrial equipment with communication function. The wearable computer includes a wristwatch, a head-mounted display, etc. Furthermore, the industrial equipment includes office equipment such as a multifunction peripheral/printer/product (MFP), medical equipment such as an endoscope, agricultural equipment such as a cultivator, etc.

REFERENCE SIGNS LIST

10 Terminal
11 Transmitting/receiving unit
17 Status-information generating unit
18 Reception-information generating unit
20 Communication control device
21 Transmitting/receiving unit
22 Status-information acquiring unit
23 Communication determining unit
24 Reception-information acquiring unit
25 Quality control unit
30 Relay device
31 Transmitting/receiving unit
33 Transfer control unit
40 Communication network
2000 Storage unit
2200 Quality management DB

What is claimed is:

1. A communication control device configured to control data communication between a plurality of terminals over a communication network, the communication control device comprising:
    processing circuitry configured to:
        acquire pieces of status information, each piece of status information representing an operating state of a corresponding terminal of the plurality of terminals;
        acquire pieces of reception information, each piece of reception information representing a state of the communication network when a corresponding terminal of the plurality of terminals has received data;
        determine whether communication is one-way communication or two-way communication based on a combination of the pieces of status information of multiple terminals that participate in a same communication; and
        when the communication is determined to be one-way communication, determine a terminal, participating in the one-way communication, that is leading the one-way communication; and
        control a quality of data that each terminal transmits or receives in the communication based on the type of communication and the pieces of reception information, wherein
    each piece of status information includes an on/off state of a corresponding microphone that inputs voice,
    when the combination of the pieces of status information of the multiple terminals that participate in the same communication indicates that a microphone of only one terminal is in an on state and microphones of the other terminals are all in an off state, the processing circuitry determines that the communication is one-way communication and that the terminal whose microphone is in an on state is leading the one-way communication, and
    when the communication is determined to be one-way communication, the processing circuitry controls the quality of data transmitted by the terminal leading the one-way communication to be higher than a quality of data transmitted or received by terminals subordinate in the one-way communication.

2. The communication control device according to claim 1, further comprising:
    a memory configured to store therein a correspondence table that associates the reception information with a quality parameter relating to quality of data with respect to each type of communication, wherein
    the processing circuitry determines a quality parameter of data that each terminal transmits or receives with reference to the correspondence table.

3. The communication control device according to claim 2, wherein the processing circuitry is further configured to
    notify a relay device, which relays data communication between terminals, of the determined quality parameter, and
    instruct the relay device to convert data transmitted from a transmitting-side terminal into data with quality indicated by the quality parameter and transmit the converted data to a receiving-side terminal.

4. The communication control device according to claim 2, wherein the processing circuitry is further configured to
    notify a transmitting-side terminal that transmits data of a determined quality parameter of data, and
    instruct the transmitting-side terminal to transmit data with quality indicated by the quality parameter.

5. The communication control device according to claim 1, wherein
    the pieces of status information include an on/off state of a camera that takes a video, and
    when the combination of the pieces of status information of the multiple terminals that participate in the same communication indicates that a camera of only one terminal is in an on state and cameras of the other terminals are all in an off state, the processing circuitry determines that the communication is one-way communication and that the terminal whose camera is in an on state is leading the one-way communication.

6. The communication control device according to claim 1, wherein
    the pieces of status information include a screen-sharing state of a display device, and
    when the combination of the pieces of status information of the multiple terminals that participate in the same communication indicates that data transmitted by one terminal is shared among screens of all the terminals, the processing circuitry determines that the communication is one-way communication and that a source terminal of the data shared among the screens is leading the one-way communication.

7. The communication control device according to claim 1, wherein
    the pieces of status information include a screen layout state of a display device, and
    when the combination of the pieces of status information of the multiple terminals that participate in the same communication indicates that there are multiple terminals that displays thereon only a video from one terminal, the processing circuitry determines that the communication is one-way communication and that a source terminal of the only one video displayed on the multiple terminals is leading the one-way communication.

8. The communication control device according to claim 1, wherein the processing circuitry is further configured to control, when the communication is determined to be two-way communication, data transmitted by each of the terminals to be a same quality.

9. The communication control device according to claim 1, wherein the processing circuitry is further configured to determine whether the communication has changed from one-way communication to two-way communication.

10. The communication control device according to claim 9, wherein when the communication is determined to have changed from one-way communication to two-way communication, the processing circuitry controls data transmitted by each of the terminals to be a same quality.

11. The communication control device according to claim 1, wherein when the communication is determined to be one-way communication, the processing circuitry controls a resolution of video data transmitted by the terminal leading the one-way communication to be higher than a resolution of video data by the terminals subordinate in the one-way communication.

12. The communication control device according to claim 1, wherein the processing circuitry determines that the communication is one-way communication when one piece of status information indicates an on state of a camera of a corresponding terminal and remaining pieces of status information indicate an off state of cameras of corresponding terminals in the communication.

13. A communication system, comprising:
a plurality of terminals that perform data communication over a communication network; and
processing circuitry configured to:
acquire pieces of status information, each piece of status information representing an operating state of a corresponding terminal of the plurality of terminals;
acquire pieces of reception information, each piece of reception information representing a state of the communication network when a corresponding terminal of the plurality of terminals has received data;
determine whether communication is one-way communication or two-way communication based on a combination of the pieces of status information of multiple terminals that participate in a same communication;
when the communication is determined to be one-way communication, determine a terminal, participating in the one-way communication, that is leading the one-way communication; and
control a quality of data that each terminal transmits or receives in the communication based on the type of communication and the pieces of reception information, wherein
each piece of status information includes an on/off state of a corresponding microphone that inputs voice,
when the combination of the pieces of status information of the multiple terminals that participate in the same communication indicates that a microphone of only one terminal is in an on state and microphones of the other terminals are all in an off state, the processing circuitry determines that the communication is one-way communication and that the terminal whose microphone is in an on state is leading the one-way communication, and
when the communication is determined to be one-way communication, the processing circuitry controls the quality of data transmitted by the terminal leading the one-way communication to be higher than a quality of data transmitted or received by terminals subordinate in the one-way communication.

14. A communication control method for controlling data communication between a plurality of terminals over a communication network, the communication control method comprising:
acquiring pieces of status information, each piece of status information representing an operating state of a corresponding terminal of the plurality of terminals;
acquiring pieces of reception information, each piece of reception information representing a state of the communication network when a corresponding terminal of the plurality of terminals has received data;
determining whether communication is one-way communication or two-way communication based on a combination of the pieces of status information of multiple terminals that participate in a same communication;
when the communication is determined to be one-way communication, determining a terminal, participating in the one-way communication, that is leading the one-way communication; and
controlling a quality of data that each terminal transmits or receives in the communication based on the type of communication and the pieces of reception information, wherein
each piece of status information includes an on/off state of a corresponding microphone that inputs voice,
when the combination of the pieces of status information of the multiple terminals that participate in the same communication indicates that a microphone of only one terminal is in an on state and microphones of the other terminals are all in an off state, the communication is determined to be one-way communication and the terminal whose microphone is in an on state is determined to be leading the one-way communication, and
when the communication is determined to be one-way communication, the controlling includes controlling the quality of data transmitted by the terminal leading the one-way communication to be higher than a quality of data transmitted or received by terminals subordinate in the one-way communication.

15. The communication control device according to claim 9, wherein the processing circuitry determines that the communication has changed from one-way communication to two-way communication based on a change of a piece of status information indicating that a microphone of a corresponding terminal in the communication has switched from an off state to an on state.

16. The communication system according to claim 13, wherein the processing circuitry is further configured to determine whether the communication has changed from one-way communication to two-way communication.

17. The communication system according to claim 16, wherein when the communication is determined to have changed from one-way communication to two-way communication, the processing circuitry controls data transmitted by each of the terminals to be a same quality.

18. The communication system according to claim 13, wherein when the communication is determined to be one-way communication, the processing circuitry controls a resolution of video data transmitted by the terminal leading the one-way communication to be higher than a resolution of video data by the terminals subordinate in the one-way communication.

19. The communication control method according to claim 14, further comprising:

controlling, when the communication is determined to be one-way communication, a resolution of video data transmitted by the terminal leading the one-way communication to be higher than a resolution of video data by the terminals subordinate in the one-way communication.

20. The communication control method according to claim 14, further comprising:

determining whether the communication has changed from one-way communication to two-way communication.

* * * * *